(12) United States Patent
Robertson et al.

(10) Patent No.: US 6,902,096 B2
(45) Date of Patent: Jun. 7, 2005

(54) METHOD OF JOINING MATERIAL

(75) Inventors: John M. Robertson, Andover, CT (US); Thomas DeMichael, Stafford Springs, CT (US); Raymond M. Walker, Port St. Lucie, FL (US)

(73) Assignee: United Technologies Corporation, Hartford, CT (US)

( * ) Notice: Subject to any disclaimer, the term of this patent is extended or adjusted under 35 U.S.C. 154(b) by 30 days.

(21) Appl. No.: 10/074,736

(22) Filed: Oct. 29, 2001

(65) Prior Publication Data

US 2003/0085259 A1 May 8, 2003

(51) Int. Cl.[7] .......................... B23K 20/18; B23K 31/02
(52) U.S. Cl. ...................... 228/119; 228/182; 219/91.2
(58) Field of Search ................................ 228/119, 136, 228/265, 182, 171, 262.3, 262.71, 193; 219/78.01, 78.02, 86.22, 91.2

(56) References Cited

U.S. PATENT DOCUMENTS

| | | | |
|---|---|---|---|
| 4,291,566 A | | 9/1981 | Dinsdale |
| 4,529,452 A | | 7/1985 | Walker |
| 4,883,216 A | | 11/1989 | Patsfall |
| 5,048,743 A | | 9/1991 | Walker et al. |
| 5,106,012 A | * | 4/1992 | Hyzak et al. ................ 228/265 |
| 5,109,606 A | * | 5/1992 | DeMichael et al. ......... 29/889.1 |
| 5,111,570 A | | 5/1992 | Baumgarten et al. ..... 29/402.13 |
| 5,205,465 A | * | 4/1993 | Bogard et al. ............... 228/119 |
| 5,272,809 A | | 12/1993 | Robertson et al. .......... 29/889.1 |
| 6,098,871 A | | 8/2000 | Cairo et al. ................. 228/194 |
| 6,164,917 A | | 12/2000 | Frasier et al. |

FOREIGN PATENT DOCUMENTS

| | | |
|---|---|---|
| EP | 0376874 | 7/1990 |
| EP | 0887143 | 12/1998 |
| EP | 1239116 | 9/2002 |

* cited by examiner

Primary Examiner—Colleen P. Cooke
(74) Attorney, Agent, or Firm—Bachman & LaPointe, P.C.

(57) ABSTRACT

A method of repairing a part, such as a rotating disk/drum rotor of a gas turbine engine. The method includes: heating a contact area of a wrought material and a contact area of a wrought part; and pressing the contact area of the material against the contact area of the part to bond the parts. A method of making a rotating part of a gas turbine engine, comprising: heating a contact area of a wrought material and a contact area of a wrought part; and pressing the contact area of the material against the contact area of the part to bond the parts. The methods may include a subsequent heat treatment to provide the desired strength properties to the joint between the material and the part.

5 Claims, 5 Drawing Sheets

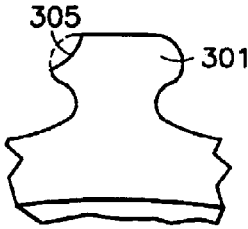
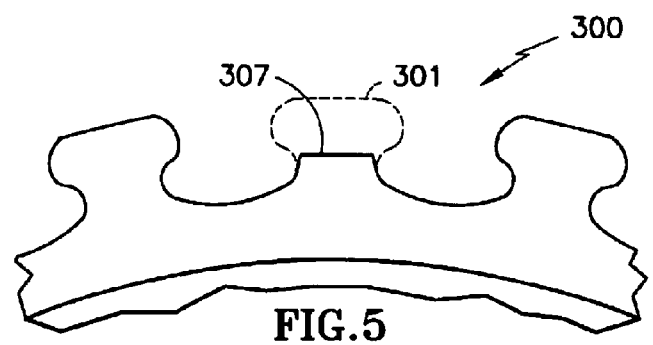
FIG.4  FIG.5
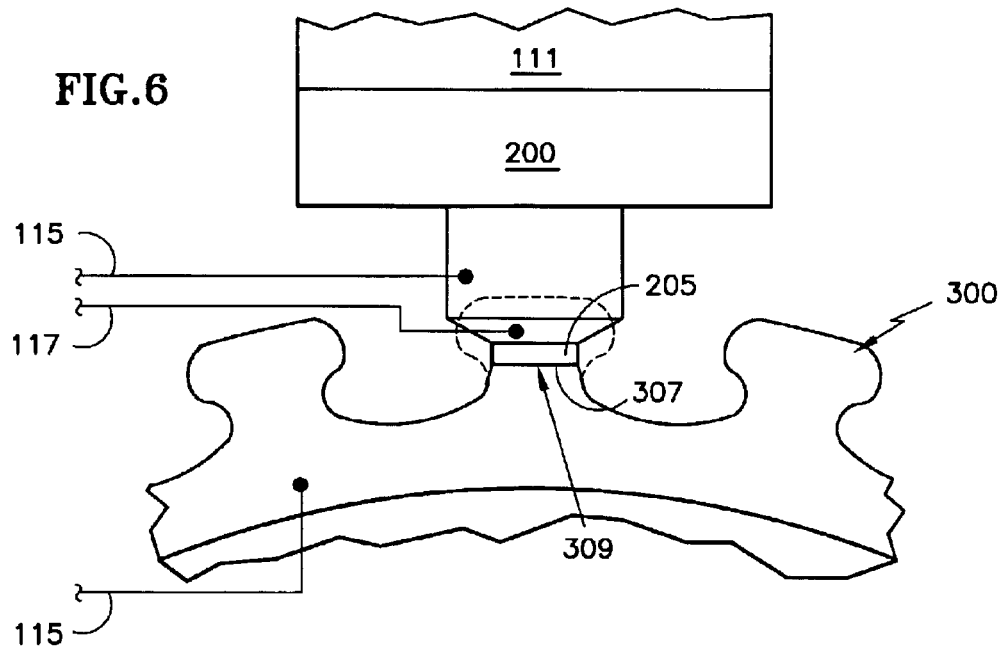
FIG.6
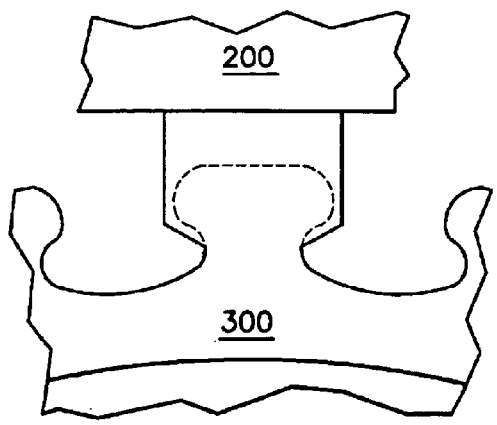
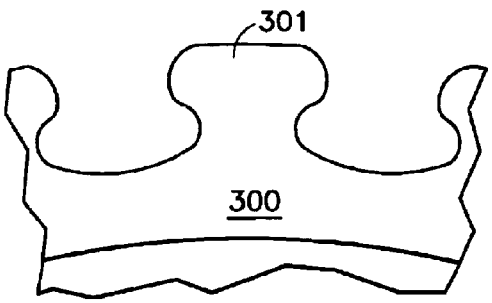
FIG.7  FIG.8

METHOD OF JOINING MATERIAL

TECHNICAL FIELD

This invention relates to a method of joining material. More particularly, this invention relates to a repair/rework method that forge joins additional material to a part.

BACKGROUND OF THE INVENTION

The major components of a gas turbine engine include (beginning at the upstream end, or inlet) a fan section, one or more compressor sections, a burner section, one or more turbine sections, and a nozzle. The engine may also include an afterburner.

Air enters the engine through the inlet, travels past the fan section, becomes compressed by the compressor sections, mixes with fuel, and combusts in the burner section. The gases from the burner section drive the turbine sections, then exit the engine through the nozzle. If present, the afterburner could augment the thrust of the engine by igniting additional fuel downstream of the burner section.

The conditions (e.g. temperature and stress) at which certain sections of an engine operate demand the use of high temperature and high strength materials. Such materials include nickel-based superalloys and titanium alloys. The cost of manufacturing parts made from these materials can be quite high. For example, certain engine parts made from these high temperature, high strength materials could have a value of approximately $200,000.

Errors can occur during the assembly or maintenance of the engine. Damage to parts can occur during the assembly, maintenance or operation of the engine. Such errors or damage create anomalies on the part that may render the part unsuitable for use. Due to the relatively high manufacturing costs of these parts, scrapping an unsuitable part is not preferred. Scrapping the unsuitable part should be used as a last resort since the engine part could have a value of over $200,000.

Rather, the preferred solution is to repair or to rework the unsuitable part. The repair/rework should remove the anomaly so as to render the part suitable for use. This obviously assumes that the part has suitable characteristics to withstand such repair or rework. However, current repair or rework techniques are not compatible with the aforementioned high temperature, high strength materials. Current techniques produce unwanted tensile debits and fatigue debits.

Current repair or rework techniques include fusion welding, plasma spraying, plating and brazing. Fusion welding unfortunately creates strain age cracking (particularly with the nickel-based superalloys) and embrittlement (particularly with the highly alloyed, alpha beta titanium materials) in these materials. Plasma spray and plating likewise create excessive residual stress in these materials due to the high thickness build-ups. Clearly, these techniques are not compatible with high temperature, high strength materials. Thus, a need exists for a repair or rework method that is compatible with the aforementioned high temperature, high strength materials.

DISCLOSURE OF THE INVENTION

Thus, it is an object of the present invention to provide a new and improved method of repairing or reworking a part.

It is a further object of the present invention to provide a repair/rework method compatible with high temperature, high strength materials.

It is a further object of the present invention to provide a repair/rework method that retains the strength capability of the original part.

It is a further object of the present invention to provide a repair/rework method that retains the fatigue capability of the original part.

It is a further object of the present invention to provide a repair/rework method that achieves uniform deformation characteristics.

It is a further object of the present invention to provide a repair/rework method that does not dimensionally distort the part.

It is a further object of the present invention to provide a repair/rework method that does not metallurgically damage the part.

It is a further object of the present invention to provide a repair/rework method that does not affect the performance of the engine.

It is a further object of the present invention to provide a repair/rework method capable of repairing/replacing a dovetail slot on a multi-stage drum rotor comprised of a high strength alloy which cannot be repaired by conventional fusion welding, plasma spraying, plating or brazing.

It is a further object of the present invention to provide a method of joining material.

It is a further object of the present invention to provide a method of forge joining material to a part.

It is a further object of the present invention to reduce the amount of scrap parts.

These and other objects of the present invention are achieved in one aspect by a method of repairing a part, comprising the steps of: providing a wrought part having a contact area and an anomaly that renders the part unsuitable; providing a wrought material having a contact area; heating the contact area of the material and the contact area of the part; and pressing the contact area of the material against the contact area of the part. The material bonds to the part to render the part suitable.

These and other objects of the present invention are achieved in another aspect by a part produced by the method steps of: providing a wrought part having a contact area; providing a wrought material having a contact area; heating the contact area of the wrought material and the contact area of the wrought part; and pressing the contact area of the material against the contact area of the wrought part. The material bonds to the wrought part.

These and other objects of the present invention are achieved in another aspect by a method of making a rotating part of a gas turbine engine, comprising the steps of: providing a rotating part made from a wrought material and having a contact area; providing a piece of wrought material having a contact area; heating the contact area of the material and the contact area of the part; and pressing the contact area of the material against the contact area of the part. The material bonds to the part.

These and other objects of the present invention are achieved in another aspect by a method of repairing a rotating disk or drum rotor of a gas turbine engine, comprising the steps of: providing a rotating disk or drum rotor made from a wrought material and having an arrangement of lugs and slots, at least one of the lugs or the slots having an anomaly thereon; treating the anomaly to form a contact area; providing a piece of wrought material having a contact area; heating the contact area of the material and the contact area of the component; pressing the contact area of the material against the contact area of the component so that the material bonds to the component; and treating the material to provide a desired shape to the disk or drum.

BRIEF DESCRIPTION OF THE DRAWINGS

Other uses and advantages of the present invention will become apparent to those skilled in the art upon reference to the specification and the drawings, in which:

FIG. 2a is a plan view of a fixture that secures to the stand of FIG. 1a;

FIG. 2b is a side elevational view of the fixture of FIG. 2a;

FIG. 4 is a detailed, front elevational view of one section of the engine component of FIG. 3 before performing any of the method steps of the present invention;

FIGS. 5–8 are front elevational views of a section of the engine component at various stages of performing the method steps of the present invention;

BEST MODE FOR CARRYING OUT THE INVENTION

The present invention relates to a method of joining material. In particular, the method is used to repair or to rework a part by forge joining additional material thereto.

Figure 1A:
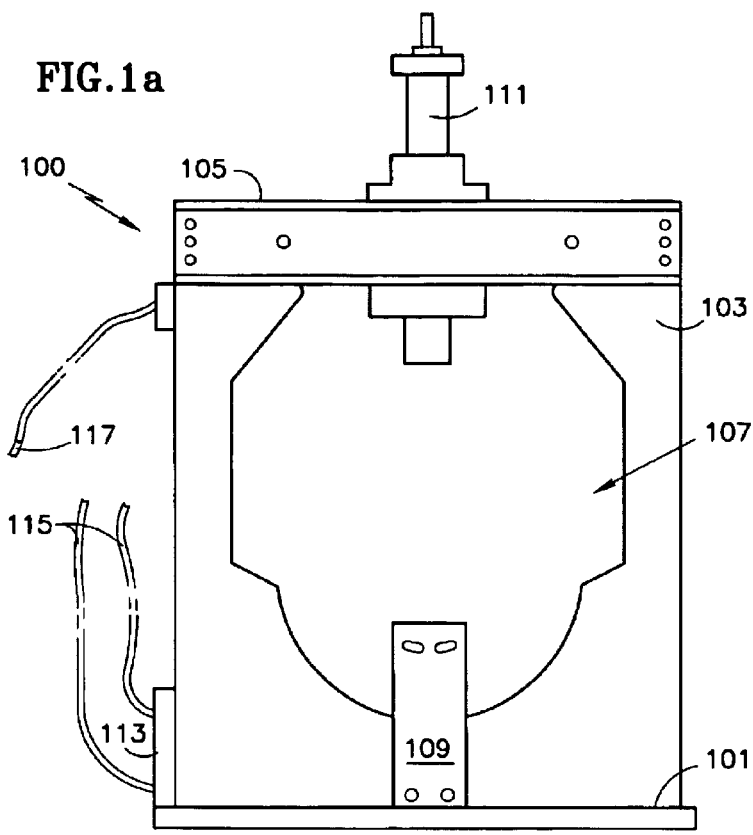
FIG. 1a is a front elevational view of a stand used to perform the method steps of the present invention.
Figure 3:
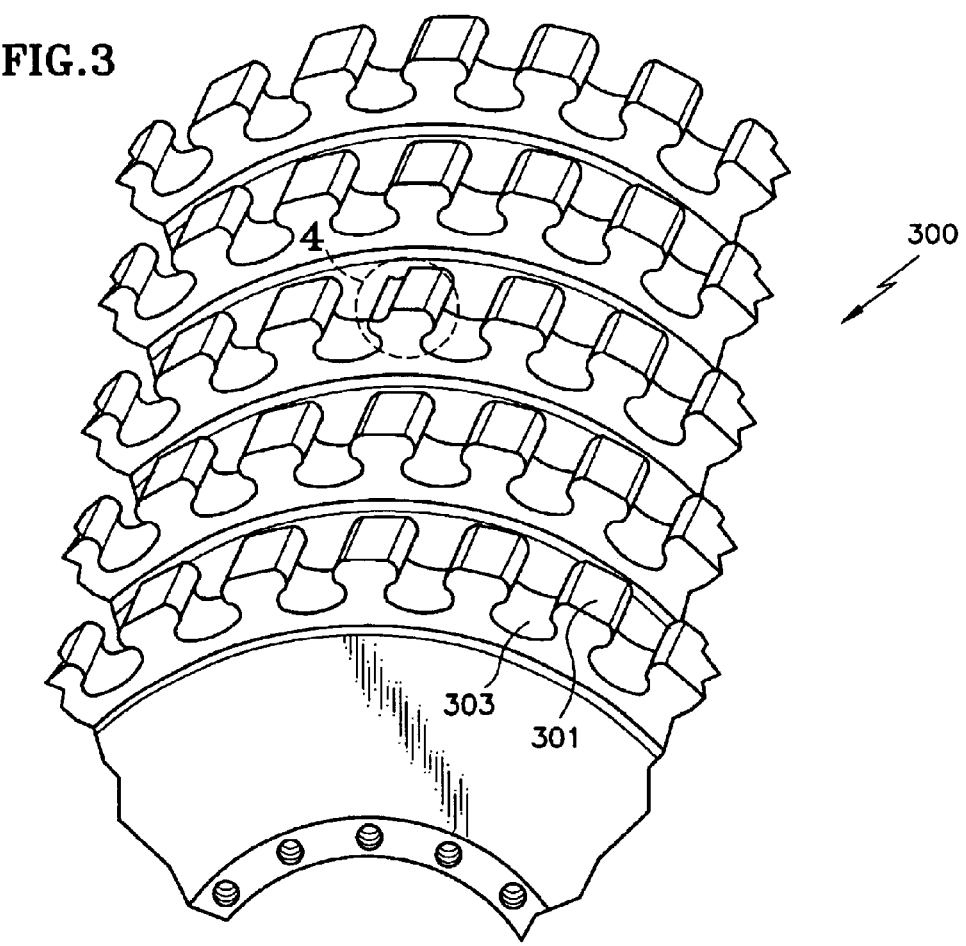
FIG. 3 is a partial perspective view of the engine component of FIG. 1b.

FIG. 1a displays an example of a stand 100 that can perform the method steps of the present invention. Generally speaking, the stand 100 is used to bond additional material to a part 300. Although the method steps of the present invention could be performed on any type of part, the following description illustrates one preferred application of the present invention FIG. 3 displays the preferred part 300, a rotating component of a gas turbine engine (not shown). The rotating component could be a disk or a hollow drum rotor. The rotating component receives one or more stages of blades (not shown) around the perimeter. The disk/drum has a circumferential arrangement of lugs 301. Slots 303 exist between adjacent lugs 301 to receive a corresponding base (not shown) of a blade. The disk/drum and blades could be part of the fan section, compressor section or turbine section of the engine.

The specific size, shape or arrangement of the disk/drum is not directly relevant to the present invention. However, the material comprising the disk/drum is relevant. The disk/drum should be a high temperature, high strength, wrought material. Preferably, the material is not fusion weldable and has a fine grain. Such materials include nickel-based superalloys (e.g. IN100, MERL 76, AF2-IDA, UDIMET 700, RENÉ 95) or titanium alloys (e.g. Ti-6Al-2Sr-4Zr-6Mo, Ti-6Al-4V, Ti-6Al-2Sr-4Zr-2Mo).

FIG. 4 displays a detailed view of one of the lugs 301 of the disk/drum. The lug 301 has an anomaly 305 thereon. The ideal shape of the lug 301 is shown as a phantom line. Therefore, the anomaly 305 in the figure is a lack of material. Other types of anomalies, such as a deformation of the material, are possible.

A variety of situations can cause the anomaly 305 on the disk/drum. The primary cause of the anomaly 305 is mis-machining of the disk/drum during manufacture. Damage during manufacture or during operation of the engine could also cause the anomaly 305.

The anomaly 305 clearly renders the disk/drum unsuitable for use in the engine. The method steps of the present invention are used to perform the necessary repair/rework on the disk/drum so that the part can be placed in service on the engine. In other words, the present invention reduces the number of parts that are scrapped.

Once recognizing that the anomaly 305 on the part 300 exists, the repair/rework process can begin. One of the steps in repairing/reworking the disk/drum involves treating the anomaly 305. The preferred method of treating the anomaly 305 comprises machining the anomalous lug 301 using conventional techniques and equipment (not shown). Other methods, however, could be used. The machining step produces a surface suitable for the subsequent steps of the present invention. As seen in FIG. 5, machining the anomalous lug 301 produces a contact area 307. Preferably, the contact area 307 is planar. However, other shapes are possible. The phantom line in FIG. 5 outlines the ideal shape of the lug.

Figure 2A:
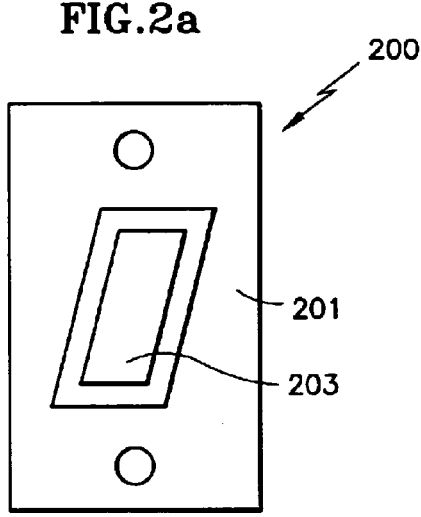
Figure 2B:
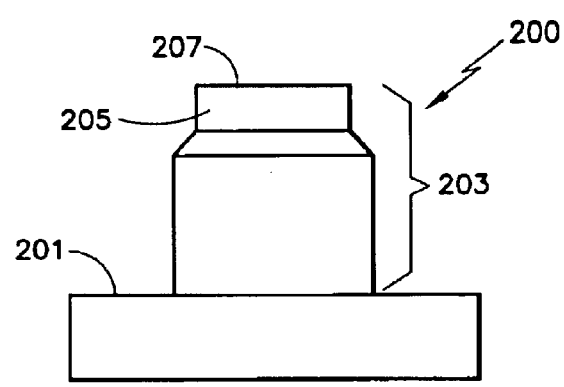

Another step in the repairing/reworking of the disk/drum involves obtaining suitable replacement material for the anomalous lug 301. FIGS. 2a and 2b display a fixture 200 that includes suitable replacement material. The fixture 200 has a base 201 for securing to the stand 100 using suitable fasteners (not shown). The fixture 200 also has a replacement section 203. As will be described in more detail in the subsequent steps, at least a portion of the replacement section 203 will become a part of the lug 301.

Since the replacement section 203 becomes part of the lug 301, the amount of material comprising the replacement section 203 should be greater than the amount of material needed to correct the anomalous lug 301. Although larger, the replacement 203 should have a shape and size generally similar to the lug 301 in order to reduce the amount of scrap material produced.

Preferably, the replacement section 203 could use the same high temperature, high strength wrought material as the lug 301. However, the replacement section 203 could use materials that are different than the lug 301.

As seen in FIG. 2b, the distal end of the replacement section 203 includes a sacrificial portion 205. The purpose of the sacrificial portion 205 will be described in more detail below.

The distal end of the sacrificial portion 205 includes a contact area 207. The contact area 207 corresponds to the contact area 307 formed on the lug 301. Although the contact area 307 preferably has a planar shape, other shapes are possible. The contact areas 207, 307 should also have the same general size.

For the remaining steps, the part 300 must be placed in the stand 100. The earlier steps could either have been performed with the part 300 installed in the stand 100 or before the part 300 has been placed in the stand 100.

Figure 1B:
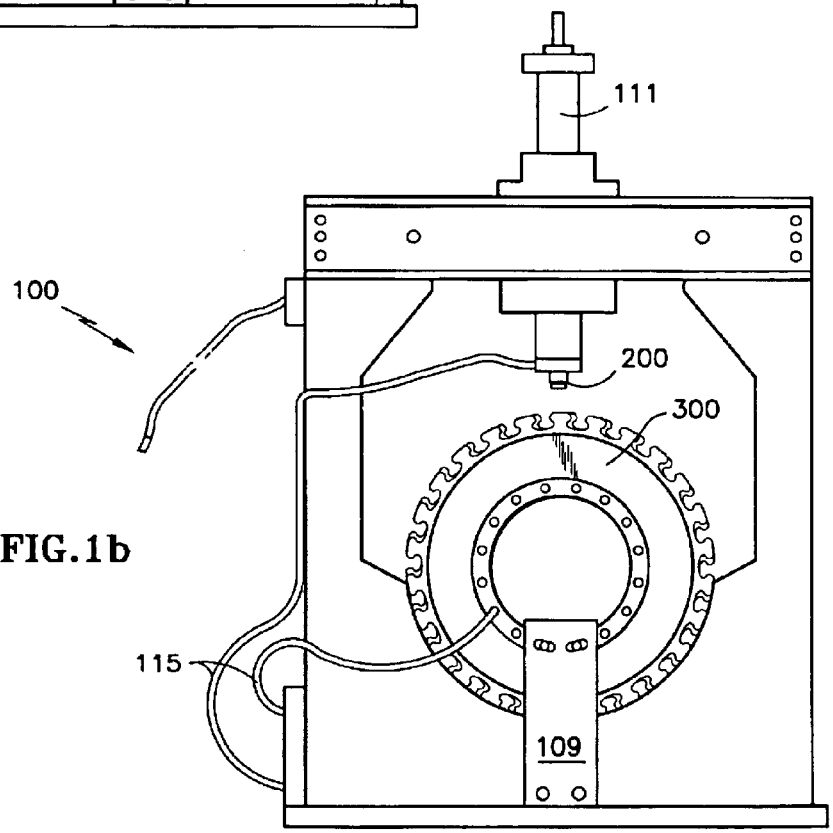
FIG. 1b is a front elevational view of the stand with a component of a gas turbine engine placed therein.

Referring to FIG. 1a, the stand 100 has a base 101, sides 103 and an upper section 105. The sides 103 and the upper section 105 define an opening 107 for receiving the part 300. FIG. 1b displays the part 300 placed within the stand 100.

The part 300 rests on correspondingly shaped sections of the sides 103. A bar 109 secured to the base 101 can mount, using suitable fasteners, to the front of the part 300. The sides 103 and the bar 109 provide suitable support to the part 300 during the subsequent steps.

The stand 100 includes a ram 111 mounted to the upper section 105. Preferably, the anomalous lug 301 on the part 300 secured to the stand 100 is located directly below the ram 111. The ram 111 could be a conventional hydraulic cylinder. In order to perform properly, the ram 111 should be at least a 1 ton hydraulic press.

The stand 100 also includes a power supply 113. The power supply 113 can be any conventional device, such as a transformer. The power supply 113 preferably converts an AC source (not shown) to DC. The power supply 113 has electrical cables 115 that secure, using known techniques, to the fixture 200 and to the part 300. As will be discussed below, the cables 115 allow DC current to flow between the fixture and the part 300 for resistance heating. In order to perform properly, the power supply 113 could be a Goodrich 480 Volt, 25 KVA gun-style welding transformer controlled by a compatible Research, Inc. SCR.

The stand 100 also includes a temperature sensor 117. The sensor 117 could have any conventional design sufficient to determine the high temperature attained by a part heated by the power supply 113.

Although not shown, the stand 100 also includes the necessary electronics and mechanical elements necessary to operate the ram 111 and the power supply 113 and to receive data from the temperature sensor 117. The method steps of the present invention could be performed manually by an operator (not shown) or automatically using suitable electronics (not shown).

Although specific parts have been described, the stand 100 could be any suitable frame that can support the part 300 and can perform the necessary steps of the present invention.

Another step in the repairing/reworking of the disk/drum involves using the ram 111 to place the contact surface 207 of the fixture 200 against the contact surface 307 of the part 300. The contact surfaces 207, 307 abut and define a joint 309. At this point, the ram 111 need not apply a large force to the fixture 200. An amount of force sufficient to retain the fixture 200 against the part 300 and to allow current to travel across the joint 309 is preferred. FIG. 6 displays the fixture 200 placed against the part 300.

The next step in the repairing/reworking of the disk/drum involves forge joining the fixture 200 to the part 300. Forge joining has multiple stages. The first stage involves heating the joint 309. With the cables 115 attached to the fixture 200 and to the part 300, activating the power supply 113 produces resistance heating in the joint 309. Aside from the joint 309, the remainder of the part 300 does not increase significantly in temperature. In other words, the heating remains localized to the joint 309 and does not metallurgically affect the remainder of the part 300. The heating remains localized due to the discontinuity between the fixture 200 and the part 300 across the contact areas 207, 307. The discontinuity creates an area with a resistance value higher than the remaining areas of the part 300.

The power supply 113 operates to allow the joint 309 to achieve a suitable bonding temperature. Preferably, power supply 113 heats the joint 309 until the material at the joint 309 achieves a superplastic state. For example, the power supply 113 could heat the joint 309 at a rate of approximately 200° F./min to the bond temperature. The specific temperature to which the power supply 113 heats the joint 309 depends on the specific material of the fixture 200 and the part 300. As an example, an IN 100 material achieves a superplastic state at approximately 1800° F. The sensor 117, seen in FIG. 6 as attached to the fixture 200 adjacent the joint 309 using conventional techniques, determines the temperature of the joint 309.

Upon reaching the desired bond temperature, the power supply 113 will supply adequate power to maintain the joint 309 within the superplastic temperature range. Using the previous example, the power supply 113 continues to heat the IN100 material to maintain a temperature of approximately 1800° F.

The next stage of the forge joining step involves pressing the fixture 200 against the part 300. Upon the joint 309 reaching the desired temperature, the ram 111 activates to drive the fixture 200 towards the part 300. Preferably, the ram 111 rapidly ramps up hydraulic pressure to a desired load sufficient to bond the fixture 200 to the part 300. For example, the desired bond load for the IN100 material is approximately 15 ksi.

The ram 111, while maintaining the desired load, drives the fixture 200 a sufficient distance towards the part 300 to ensure that an adequate bond occurs. The upset distance that the ram 111 drives the fixture 200 should be at least the thickness of the sacrificial portion 205. Actuation of the ram 111 causes the sacrificial section 205 to expand laterally to occupy areas to the sides of the joint. The specific upset distance that the ram 111 drives the fixture 200 depends upon the material of the fixture 200 and the part 300. For example, the ram 111 should drive an IN100 material a distance of approximately 0.100" at the desired load of 15 ksi.

Aside from the sides 103 and the bar 109, no other support exists to reinforce the hollow disk/drum against the forces produced by the ram 111. Due to the superplastic state of the material adjacent the joint 309, the forces created during operation of the ram 111 remain localized to the joint 309. That is, no substantial forces are transmitted to the remainder of the disk/drum during operation of the ram 111. Thus, the ram 111 does not dimensionally distort the remainder of the disk/drum.

FIG. 7 displays the fixture 200 and the part 300 after the forge joining step. The replacement section 203 of the fixture has now bonded to the part 300. The power supply 113 deenergizes to allow the part 300 to cool. Preferably, the cooling rate exceeds approximately 200° F./min.

If necessary, the part could undergo other steps after forge joining. These steps could help the part obtain the desired material characteristics. For example, the part could undergo a soak for a duration of time before cooling. The part could also undergo an additional localized heat treatment. For example, this treatment may locally heat the part 300 at approximately 50° F./min (±25° F./min) to an age temperature of 1350° F. The heat treatment maintains such temperature for approximately 2 hours. Finally, the heat treatment allows the part 300 to cool to room temperature at a rate at least equivalent to air cooling.

FIG. 7 shows that the amount of material needed to correct the anomalous lug 301 is less than the amount of material comprising the replacement section 203. As a consequence, another step in the repairing/reworking of the disk/drum involves removing the surplus material. Preferably, the surplus material is machined using conventional techniques and equipment (not shown). Other methods, however, could be used. FIG. 8 displays the part 300 after machining away the surplus material. The lug 301 no longer has the anomaly.

Importantly, the method steps of the present invention produce a replacement lug 301 that has the same metallurgical characteristics as an original lug 301. In other words, the replacement lug 301 exhibits approximately the same strength capability, fatigue capability and deformation characteristics as the original lug 301. As seen in FIG. 8, the naked eye cannot discern a bond line at the joint 309 between the replacement section 203 and the part 300.

Figure 9:
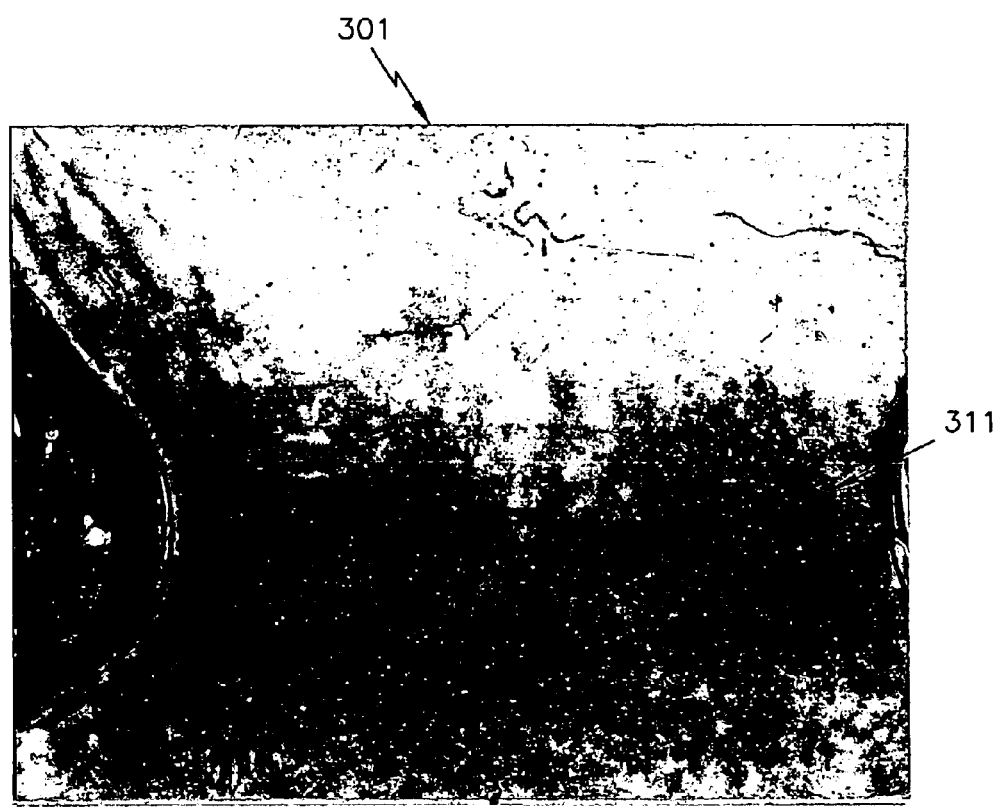
FIG. 9 is a computer rendering of a 16X photomicrograph of the bond line formed by the method steps of the present invention.
Figure 10:
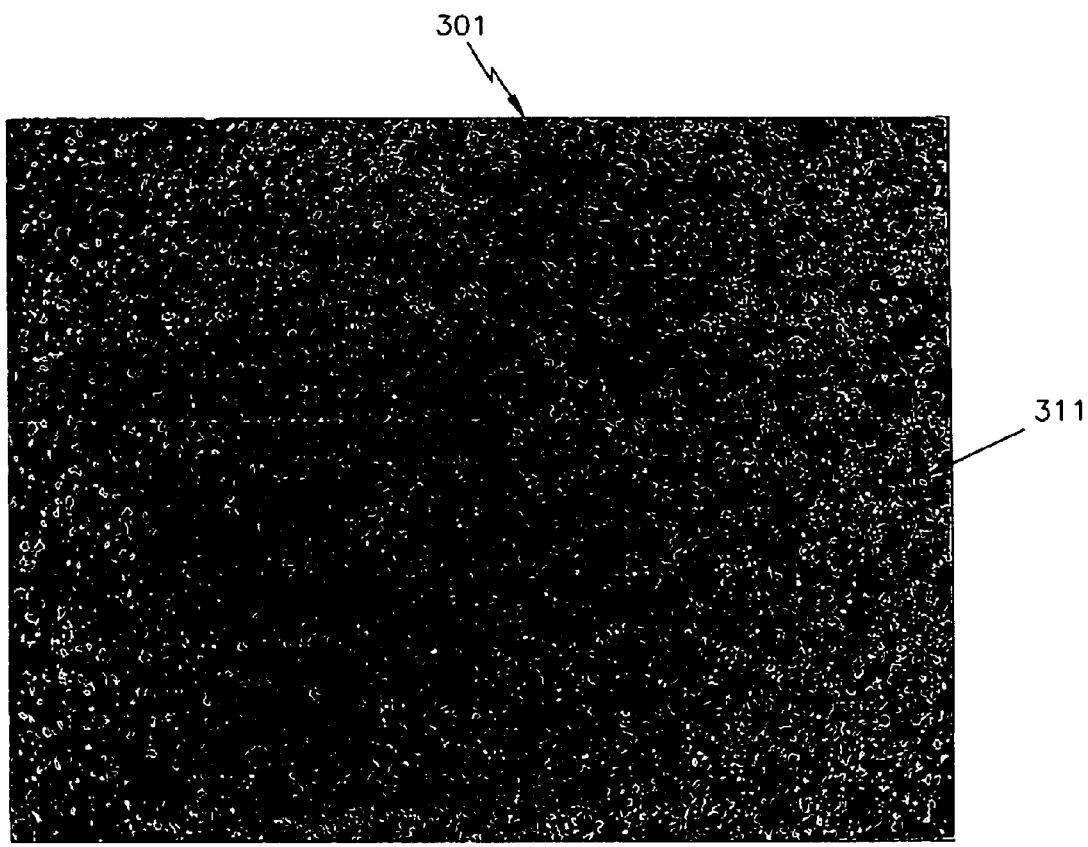
FIG. 10 is a computer rendering of a 200X blue tape photomicrograph of the bond line formed by the method steps of the present invention.

Only under magnification can one discern a bond line 311. FIG. 9 is a computer rendering of a low magnification (16X) photomicrograph of a bond line 311 using Kalling's etchant. The photomicrograph displays the presence of the bond line 311 at the joint 309 between the replacement section 203 and the part 300. FIG. 10 is a computer rendering of a photomicrograph (200X) of the bond line 311 using Kaling's etchant. The photomicrograph confirms the bond line 311 at the joint 309 between the replacement section 203 and the part 300.

To ensure that the bond line 311 does not affect the strength of the replacement lug, a test was conducted to forge join a replacement lug to a scrap high pressure compressor disk/drum. Both parts were made from a wrought IN-100 material. Specifically, the experiment forge joined the replacement lug to the disk/drum by upsetting the replacement lug 0.100" at a bond temperature of 1800° F. and at a bond load of 15 ksi.

The test then subjected the replacement lug and an original lug (i.e. a lug without an anomaly) to a tensile load using conventional equipment. The test revealed that the replacement lug and the original lug failed at approximately the same load even though each lug had a different failure location. In fact, the original lug failed before the replacement lug (13,080 lbs and 13230 lbs, respectively). Therefore, the test confirmed that the replacement lug exhibited the same strength characteristic as the original wrought part.

In order to establish the preferred parameters for the methods of the present invention (such as those used in the aforementioned test), multiple experiments were conducted. The experiments forge joined two IN-100 rods (0.5" diameter, 3" length) together using the parameters specified in the table below.

drum could be formed without the lugs 301 (e.g. the disk/drum has contact areas 307 such as seen in FIG. 6). The forge joining step would then add the lugs 301 to the disk/drum.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of repairing a part, comprising the steps of:
   providing a wrought part having a contact area and an anomaly that renders said part unsuitable;
   providing a high strength wrought material having a contact area;
   heating said contact area of said wrought material and said contact area of said wrought part through direct contact between said contact areas of said wrought material and said contact area of said wrought part by connecting said wrought material and said part to an electrical power source; and
   pressing said contact area of said material against said contact area of said part;
   wherein said material bonds to said part to render said part suitable.

2. The method as recited in claim 1, wherein said part is not fusion weldable.

3. The method as recited in claim 2, wherein said part is a nickel-based superalloy or a titanium alloy.

4. The method as recited in claim 3, wherein said material is made from the same material as said part.

TABLE 1

| Bond Temp ° F. | Bond Load ksi | Upset Inch | Soak Temp ° F. | Cool Rate ° F./min | Age Heat Treat | Tensile Test Temp ° F. | Yield Strength ksi | Ultimate Tensile Strength Ksi | Elongation % | Area Reduction % |
|---|---|---|---|---|---|---|---|---|---|---|
| 1800 | 30 | 0.100 | 2065 | 15 | Local | 75 | 155.9 | 197.0 | 8.5 | 11.6 |
| 1800 | 15 | 0.090 | None | 75 | Isothermal | 75 | 174.8 | 177.0 | 2.5 | 7.0 |
| 1800 | 15 | 0.090 | None | 75 | Isothermal | 75 | 174.2 | 183.7 | 4.5 | 6.3 |
| 1800 | 15 | 0.090 | None | 75 | Isothermal | 75 | 174.5 | 205.9 | 9.0 | 10.8 |
| 1800 | 30 | 0.100 | 2065 | 15 | Local | 800 | 150.6 | 184.4 | 7.8 | 12.3 |
| 1800 | 30 | 0.100 | 2065 | 15 | Local | 800 | 149.6 | 168.6 | 4.9 | 10.1 |
| 1800 | 15 | 0.090 | None | 75 | Isothermal | 800 | 153.0 | 205.2 | 13.4 | 15.0 |
| 1900 | 25 | 0.110 | 1850 | 150 | Local | 1000 | 151.1 | 158.0 | 2.2 | 3.7 |
| 1900 | 25 | 0.110 | 1850 | 150 | Local | 1000 | 152.9 | 173.2 | 5.1 | 10.9 |
| 1900 | 25 | 0.110 | 1850 | 150 | Local | 1100 | 152.4 | 166.3 | 3.3 | 7.8 |
| 1900 | 25 | 0.110 | 1850 | 150 | Local | 1100 | 152.5 | 168.8 | 3.3 | 7.8 |
| 1900 | 25 | 0.110 | 1850 | 150 | Local | 1100 | 156.8 | 186.5 | 6.7 | 11.6 |
| 1900 | 25 | 0.175 | 2065 | 150 | Local | 1100 | 144.9 | 194.2 | 15.3 | 21.6 |
| 1900 | 25 | 0.175 | 2065 | 150 | Local | 1100 | 146.4 | 191.6 | 14.5 | 22.1 |
| 1900 | 25 | 0.175 | 1850 | 150 | Local | 1100 | 146.7 | 188.0 | 11.7 | 17.8 |
| 1900 | 25 | 0.200 | None | 150 | Local | 1100 | 155.6 | 202.6 | 19.5 | 24.7 |
| 1900 | 25 | 0.200 | 1850 | 150 | Local | 1100 | 158.7 | 205.3 | 17.5 | 23.6 |
| 1900 | 25 | 0.175 | 2065 | 150 | Local | 1200 | 153.6 | 188.5 | 13.8 | 17.3 |
| 1800 | 30 | 0.100 | 2065 | 15 | Local | 1300 | 156.1 | 163.9 | 1.5 | 3.9 |
| 1800 | 15 | 0.090 | None | 75 | Isothermal | 1300 | 162.3 | 162.3 | 0.8 | 3.0 |
| 1800 | 15 | 0.090 | None | 75 | Isothermal | 1300 | 162.3 | 166.9 | 1.7 | 3.1 |
| 1800 | 15 | 0.090 | None | 75 | Isothermal | 1300 | 152.7 | 158.9 | 1.9 | 3.9 |
| 1800 | 15 | 0.090 | None | 75 | Isothermal | 1300 | 153.7 | 165.7 | 3.0 | 7.0 |

While the present invention has been described above as a repair/rework method to remove an anomaly from a part, the present invention could also be used in the original manufacture of the part 300. In such a situation, the disk/

5. The method as recited in claim 4, wherein said part is a rotating component of a gas turbine engine.

* * * * *